(12) United States Patent
Imaizumi et al.

(10) Patent No.: US 11,493,329 B2
(45) Date of Patent: Nov. 8, 2022

(54) OPTICAL MEASURING DEVICE AND OPTICAL MEASURING METHOD

(71) Applicant: Mitutoyo Corporation, Kawasaki (JP)

(72) Inventors: Ryoichi Imaizumi, Ota-ku (JP); Ichiro Taniguchi, Yokohama (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 16/825,233

(22) Filed: Mar. 20, 2020

(65) Prior Publication Data

US 2020/0318948 A1 Oct. 8, 2020

(30) Foreign Application Priority Data

Apr. 5, 2019 (JP) ............... JP2019-072408

(51) Int. Cl.
*G01B 11/08* (2006.01)
*G01B 11/24* (2006.01)

(52) U.S. Cl.
CPC .......... *G01B 11/08* (2013.01); *G01B 11/2433* (2013.01)

(58) Field of Classification Search
CPC .... G01B 11/028; G01B 11/08; G01B 11/2433
See application file for complete search history.

(56) References Cited

U.S. PATENT DOCUMENTS

| | | | | |
|---|---|---|---|---|
| 4,007,992 A | * | 2/1977 | Petrohilos | G01B 11/105 356/429 |
| 4,129,384 A | * | 12/1978 | Walker | G01B 11/08 356/640 |
| 4,895,449 A | * | 1/1990 | Marshall | G01B 11/046 250/559.15 |
| 4,938,599 A | * | 7/1990 | Goszyk | G01B 11/08 250/559.07 |
| 5,278,634 A | * | 1/1994 | Skunes | G01B 11/272 356/400 |
| 5,699,161 A | * | 12/1997 | Woodworth | G01B 11/00 356/628 |

(Continued)

FOREIGN PATENT DOCUMENTS

| | | |
|---|---|---|
| JP | 63-32308 A | 2/1988 |
| JP | 5-231827 A | 9/1993 |

(Continued)

*Primary Examiner* — Michael A Lyons
*Assistant Examiner* — Jarreas C Underwood
(74) *Attorney, Agent, or Firm* — Oblon, McClelland, Maier & Neustadt, L.L.P.

(57) ABSTRACT

An optical measuring device includes: an emission device configured to emit a scanning light, of which an optical axis parallelly moves, to an object; a light receiving element configured to perform photoelectric conversion with respect to the scanning light after passing over the object; a calculation device configured to calculate, from a voltage wave obtained from time change of an electrical signal that is output by the light receiving element, a distance corresponding to a time range from a first edge with respect to a voltage value where the scanning light is not interrupted by the object and a second edge with respect to a voltage value where the scanning light is interrupted by the object, when a part of the scanning light is interrupted by the object for the time range.

8 Claims, 12 Drawing Sheets

(56) References Cited

U.S. PATENT DOCUMENTS

| | | | | |
|---|---|---|---|---|
| 6,549,293 B2* | 4/2003 | Hofman | ............... | G01B 11/105 |
| | | | | 356/602 |
| 6,922,254 B2* | 7/2005 | Blohm | ................ | G01B 11/105 |
| | | | | 356/638 |
| 7,738,121 B2* | 6/2010 | Spalding | ............. | G01B 11/245 |
| | | | | 356/639 |
| 9,423,241 B2* | 8/2016 | Fukuda | ................. | G01B 11/08 |
| 10,060,727 B2* | 8/2018 | Imaizumi | ........... | G01B 11/2433 |
| 2002/0041381 A1* | 4/2002 | Akishiba | ........... | G01B 11/2433 |
| | | | | 356/638 |
| 2002/0101595 A1* | 8/2002 | Johnson | ................ | G01B 5/003 |
| | | | | 356/602 |
| 2006/0017940 A1* | 1/2006 | Takayama | ......... | G01B 11/2433 |
| | | | | 356/640 |
| 2010/0259769 A1* | 10/2010 | Kataoka | ............ | G01B 11/2433 |
| | | | | 356/625 |
| 2011/0264406 A1* | 10/2011 | Calame | ................. | G01B 11/08 |
| | | | | 702/155 |

FOREIGN PATENT DOCUMENTS

| | | |
|---|---|---|
| JP | 8-29131 A | 2/1996 |
| JP | 2000-275015 A | 10/2000 |
| JP | 2009-139126 A | 6/2009 |
| JP | 2011-232336 A | 11/2011 |

* cited by examiner

FIG. 6A  FIG. 6B  FIG. 6C
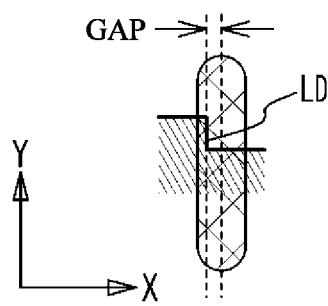
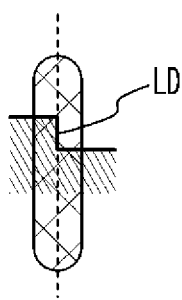
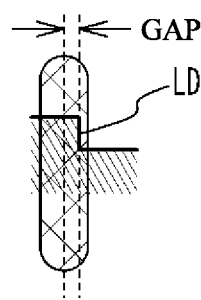
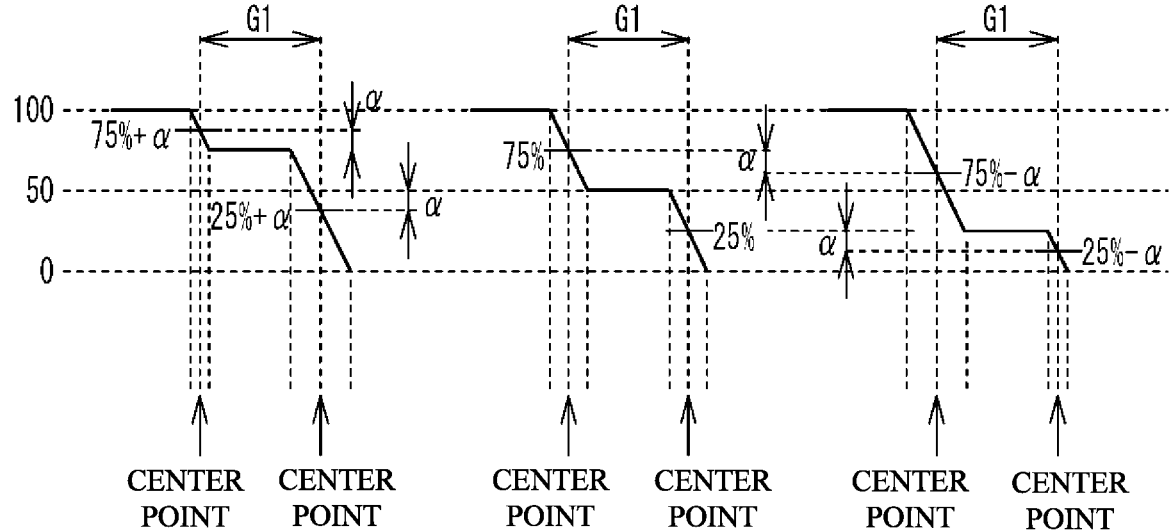

OPTICAL MEASURING DEVICE AND OPTICAL MEASURING METHOD

CROSS-REFERENCE TO RELATED APPLICATION

This application is based upon and claims the benefit of priority of the prior Japanese Patent Application No. 2019-072408, filed on Apr. 5, 2019, the entire contents of which are incorporated herein by reference.

FIELD

A certain aspect of embodiments described herein relates to an optical measuring device and an optical measuring method.

BACKGROUND

There is disclosed an optical measurement device (for example, see Japanese Patent Application Publication No. 2000-275015 and Japanese Patent Application Publication No. S63-32308). With the optical measuring device, it is possible to measure an outer diameter of an object by converting a laser beam which is rotary-scanned by a rotation mirror into a collimated light with use of a collimate lens, and locating the object between the collimate lens and a condenser lens.

SUMMARY

When a size of a level difference of a crank shaft or the like is measured by using an optical measuring device, scanning is performed twice because it is necessary to obtain two voltage waves. In the measurement, it is effective to use a shaft measuring device or a projector. However, these devices are larger and more expensive than the optical measuring device. It is therefore difficult to use the shaft measuring device or the projector.

In one aspect of the present invention, it is an object to provide an optical measuring device and an optical measuring method that are capable of measuring a level difference size by a single scanning.

According to an aspect of the present invention, there is provided an optical measuring device including: an emission device configured to emit a scanning light, of which an optical axis parallelly moves, to an object; a light receiving element configured to perform photoelectric conversion with respect to the scanning light after passing over the object; a calculation device configured to calculate, from a voltage wave obtained from time change of an electrical signal that is output by the light receiving element, a distance corresponding to a time range from a first edge with respect to a voltage value where the scanning light is not interrupted by the object and a second edge with respect to a voltage value where the scanning light is interrupted by the object, when a part of the scanning light is interrupted by the object for the time range.

According to another aspect of the present invention, there is provided an optical measuring method including: emitting a scanning light, of which an optical axis parallelly moves, to an object from an emission device; performing photoelectric conversion with respect to the scanning light after passing over the object, by using a light receiving element; calculating, from a voltage wave obtained from time change of an electrical signal that is output by the light receiving element, a distance corresponding to a time range from a first edge with respect to a voltage value where the scanning light is not interrupted by the object and a second edge with respect to a voltage value where the scanning light is interrupted by the object, when a part of the scanning light is interrupted by the object for the time range.

BRIEF DESCRIPTION OF DRAWINGS

FIG. 6A to FIG. 6C illustrate a voltage wave in which the voltage wave varies with three steps;

DESCRIPTION OF EMBODIMENTS

The following is a description of embodiments, with reference to the accompanying drawings.

Figure 1:
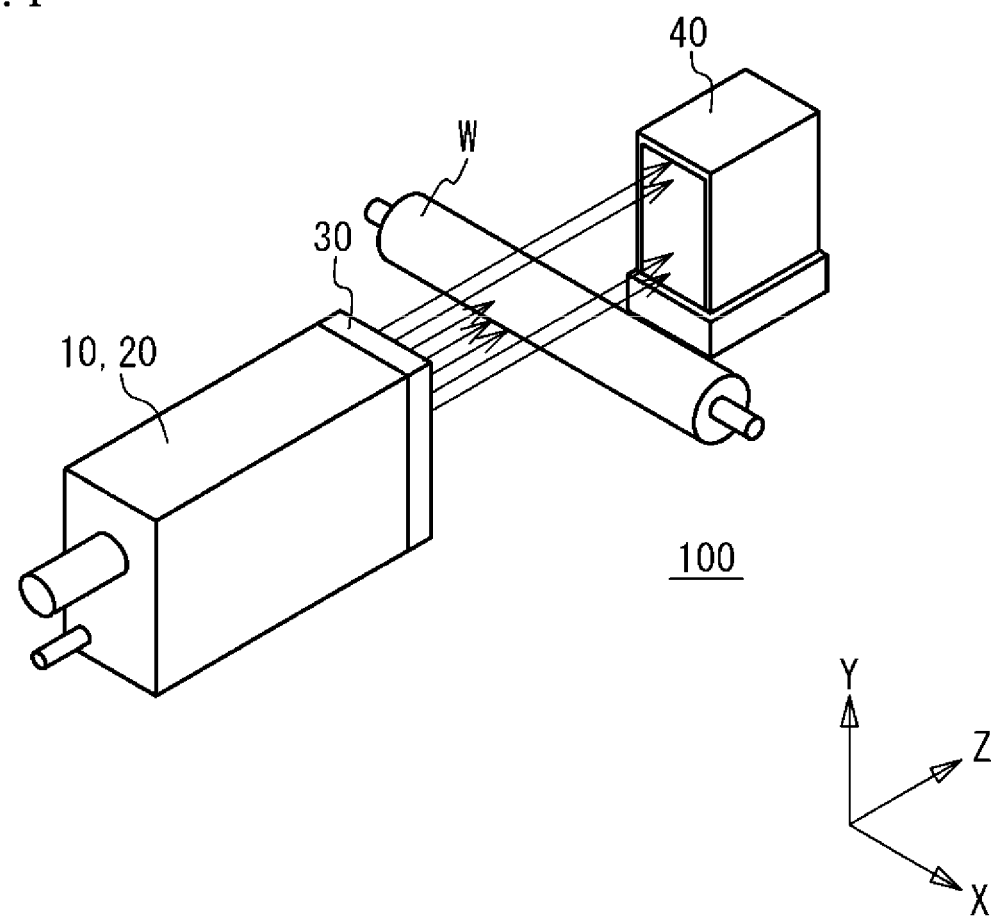
FIG. 1 illustrates a perspective view of an optical measuring device in accordance with an embodiment.
Figure 2:
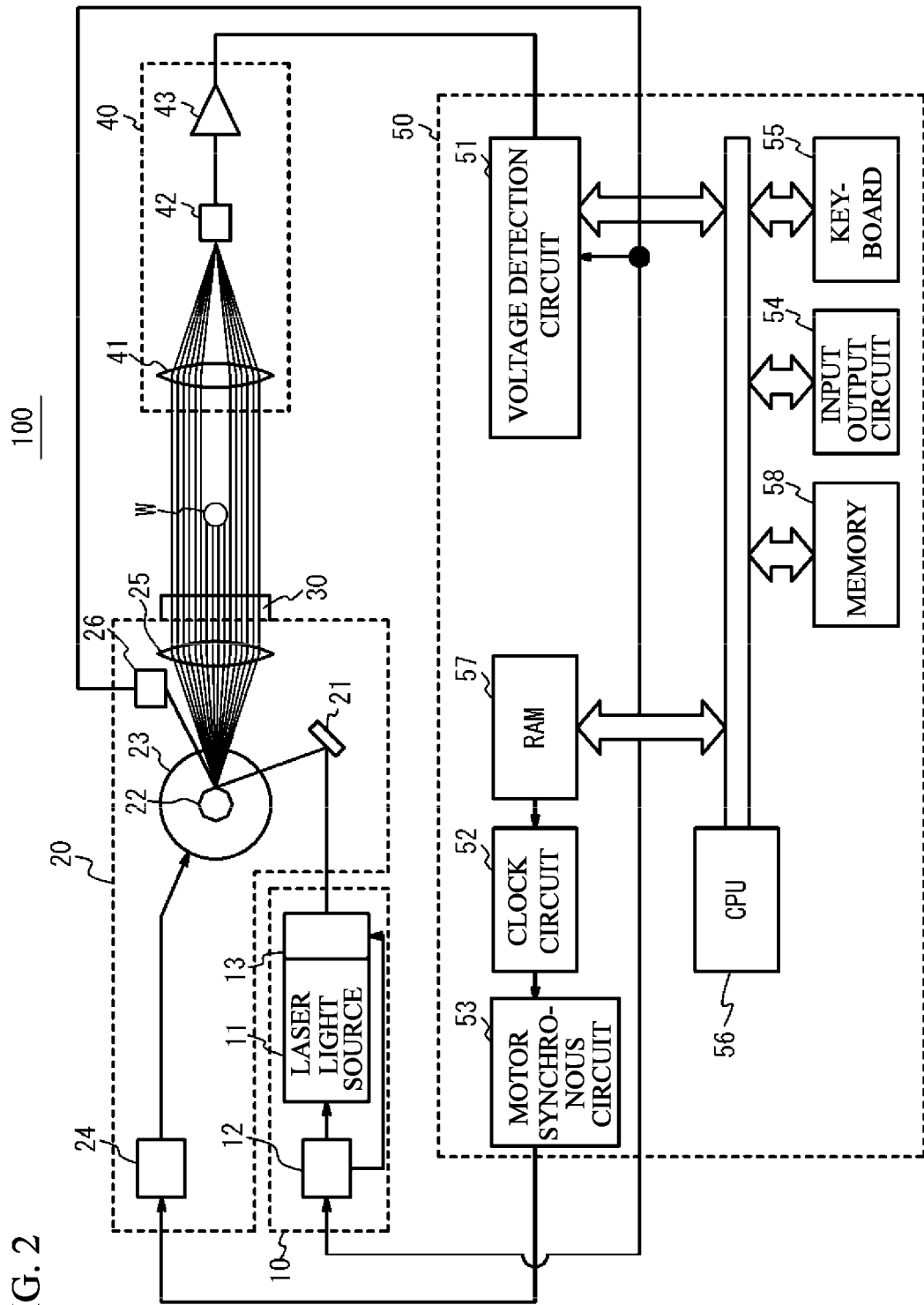
FIG. 2 illustrates a structure of an optical measuring device.

FIG. 1 illustrates a perspective view of an optical measuring device 100. FIG. 2 illustrates a structure of the optical measuring device 100. The optical measuring device 100 is a laser scan micrometer (LSM) which measures a size of an object by one-dimensionally scanning a laser light. The optical measuring device 100 is used for size measurement of an electronic device or a mechanical device or size measurement of a metal round rod or an optical fiber. In the following description, an emission direction of a laser light toward an object W is a Z direction. An axial direction of the object W is an X-direction. A direction vertical to the Z direction and the X direction is a Y direction. The Y direction coincides with a scanning direction of the laser light. As illustrated in FIG. 1 and FIG. 2, the optical measuring device 100 has a light emission device 10, a scanning device 20, a straight polarizing plate 30, a light receiving device 40, a calculation device 50 and so on.

The light emission device 10 has a laser light source 11, a laser control circuit 12, a polarization device 13 and so on. The laser light source 11 includes a semiconductor laser and so on. The laser light source 11 emits a light flux (laser light) of which a cross section has a substantially circle shape or an ellipse shape and of which a wavelength is 650 nm or the like. The laser control circuit 12 controls the laser light source 11. The laser control circuit 12 turns the laser light source 11 on and off with a high speed (for example, a few MHz to a few tens of MHz). The polarization device 13 polarizes the laser light emitted by the laser light source 11, by 90 degrees. For example, the polarization device 13 switches a case where the laser light does not pass through a λ/2 wavelength plate and a case where the laser light passes through the λ/2 wavelength plate, in accordance with an instruction of the laser control circuit 12.

The scanning device 20 has a reflection mirror 21, a rotation mirror 22, a motor 23, a motor drive circuit 24, an F-θ lens 25, a light receiving element 26 for synchronization, and so on. The reflection mirror 21 reflects the laser light emitted by the laser light source 11 and inputs the reflected laser light to the rotation mirror 22. The rotation mirror 22 is rotated by the motor 23 which is coaxially located with the rotation mirror 22. The rotation mirror 22 converts the laser light input by the reflection mirror 21 into a rotation scanning light, and inputs the rotation scanning light to the F-θ lens 25. In concrete, the rotation mirror 22 is a rotating polygon mirror in which each side face of a polygonal prism (octagonal prism in FIG. 2) acts as a reflection face. The rotation mirror 22 is rotated by the motor 23, with a rotation speed of 5000 to 20000 rpm (rotation per minute). The rotation mirror 22 changes the reflection angle of the laser light which is input to the reflection face thereof, by the rotation thereof. Thus, the rotation mirror 22 achieves polarization scanning of the laser light in a main scanning direction.

The motor drive circuit 24 supplies electrical power to the motor 23, in accordance with the output of the motor synchronous circuit 53 described later. The F-θ lens 25 converts the rotation scanning light converted by the rotation mirror 22, into a parallel scanning light with a constant speed. In concrete, the F-θ lens 25 is designed so that a scanning speed is kept constant in a circumference portion of the lens and the center portion, by changing a curvature of the two lens faces. Therefore, it is possible to measure the size of the object W by measuring the time change of the permeating intensity of the parallel scanning light which passes through the object W. The laser light converted into the parallel scanning light by the F-θ lens 25 is emitted so as to scan an object region including the object W, in accordance with the rotation of the rotation mirror 22.

The light receiving element 26 for synchronization is located outside of a scanning range in which the laser light passes through the F-θ lens 25. The light receiving element 26 for synchronization is located at a position so as to receive the laser light before starting of a single scanning or after a single scanning. The light receiving element 26 for synchronization outputs a pulse-shaped timing reference signal (hereinafter referred to as a reference signal), when the light receiving element 26 detects the starting or the end of the single scanning of the laser light. Therefore, the reference signal is output every time a single scanning of the laser light is started or finished.

The straight polarizing plate (polarization plate) 30 has a structure in which a direction of a polarizer is vertical to the emission direction (Z direction) of the laser light and an axis direction (X direction) of the object W. That is, the direction of the polarizer is a vertical direction (Y direction) with respect to a reflection face (XZ plane) of the object W. That is, when the laser light converted to a parallel scanning light by the F-θ lens 25 passes through the straight polarizing plate 30, an oscillation component horizontal (X direction) to the reflection face of the object W is shut and only a vertical component (Y direction) with respect to the reflection face passes through the straight polarizing plate 30. The object W has a cylindrical shape. Therefore, an optical axis of the parallel scanning light passing through the straight polarizing plate 30 parallelly moves in a vertical cross section with respect to the axis of the cylindrical shape of the object W, in accordance with the rotation of the rotation mirror 22.

The light receiving device 40 has a condenser lens 41, a light receiving element 42, an amplifier 43 and so on. The condenser lens 41 condenses the parallel scanning light having passed through the object W and inputs the condensed light to the light receiving element 42. The light receiving element 42 performs photoelectric conversion of the parallel scanning light condensed by the condenser lens 41. In concrete, the light receiving element 42 outputs an electrical signal having a voltage according to the light receiving intensity. When the light receiving intensity is larger, the light receiving element 42 outputs an electrical signal having a larger voltage. When the light receiving intensity is smaller, the light receiving element 42 outputs an electrical signal having a smaller voltage. It is possible to measure the size of the object W in the scanning direction in the scanning plane, by measuring the largeness of the voltage of the electrical signal. The calculation device 50 performs the size calculation process. The amplifier 43 amplifies the electrical signal output by the light receiving element 42 and outputs the amplified electrical signal to the calculation device 50.

The calculation device 50 has a voltage detection circuit 51, a clock circuit 52, a motor synchronous circuit 53, an input output circuit 54, a keyboard 55, a CPU (Central Processing Unit) 56, a RAM (Random Access Memory) 57, a memory 58 and so on. The voltage detection circuit 51 detects time change of a voltage value of an electrical signal output by the amplifier 43. It is therefore possible to detect time change of light receiving intensity of the scanning light received by the light receiving element 42.

The motor synchronous circuit 53 outputs a drive signal synchronized with a clock signal which is input by the clock circuit 52, to the motor drive circuit 24. The motor drive circuit 24 supplies electrical power to the motor 23, in accordance with the output of the motor synchronous circuit 53. Therefore, the rotation mirror 22 rotates with a speed having a predetermined correlation with the clock signal.

The input output circuit 54 outputs a calculated value (a size of the object W) or the like, to an external output device such as a display device or a printer. The keyboard 55 has operation keys. When a user presses predetermined keys of the keyboard 55, an operation signal according to the pressing operation is output to the CPU 56. The CPU 56 performs a control process, in accordance with a processing program stored in the memory 58.

The RAM 57 forms a work memory area for storing data processed by the CPU 56. The memory 58 stores a system program executed by the CPU 56, a processing program executed by the system program, data used during the execution of the processing program, result data calculated by the CPU 56, and so on. The memory 58 stores the program, in a shape of a program code which can be read by a computer.

The CPU 56 calculates a level difference of the object W, with use of time change of the voltage detected by the voltage detection circuit 51. A description will be given of details of measurement of the level difference of the object W.

Figure 3A:
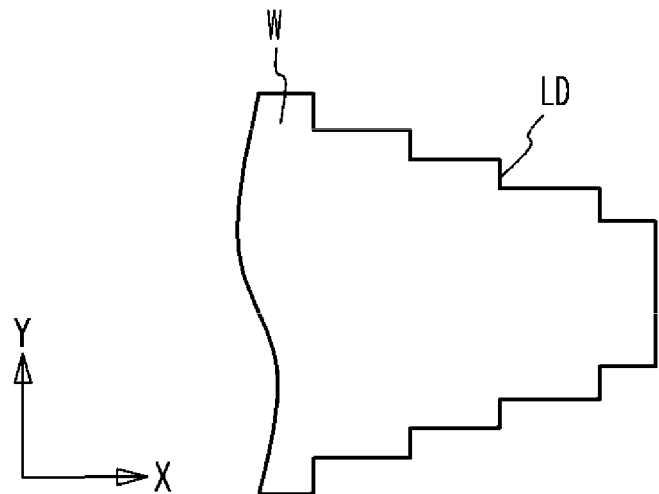
FIG. 3A illustrates a crank shaft.

As illustrated in FIG. 3A, a crank shaft is focused on as an example of the object W. The crank shaft has a structure in which a plurality of circular columns of which an outer diameter is different from each other are coaxially connected in a descending order of the outer diameter in the X-axis direction. Thus, the outer diameter of the crank shaft is downsized stepwise toward an edge in the X-axis direction. Therefore, the object W has a level difference LD.

Figure 3B:
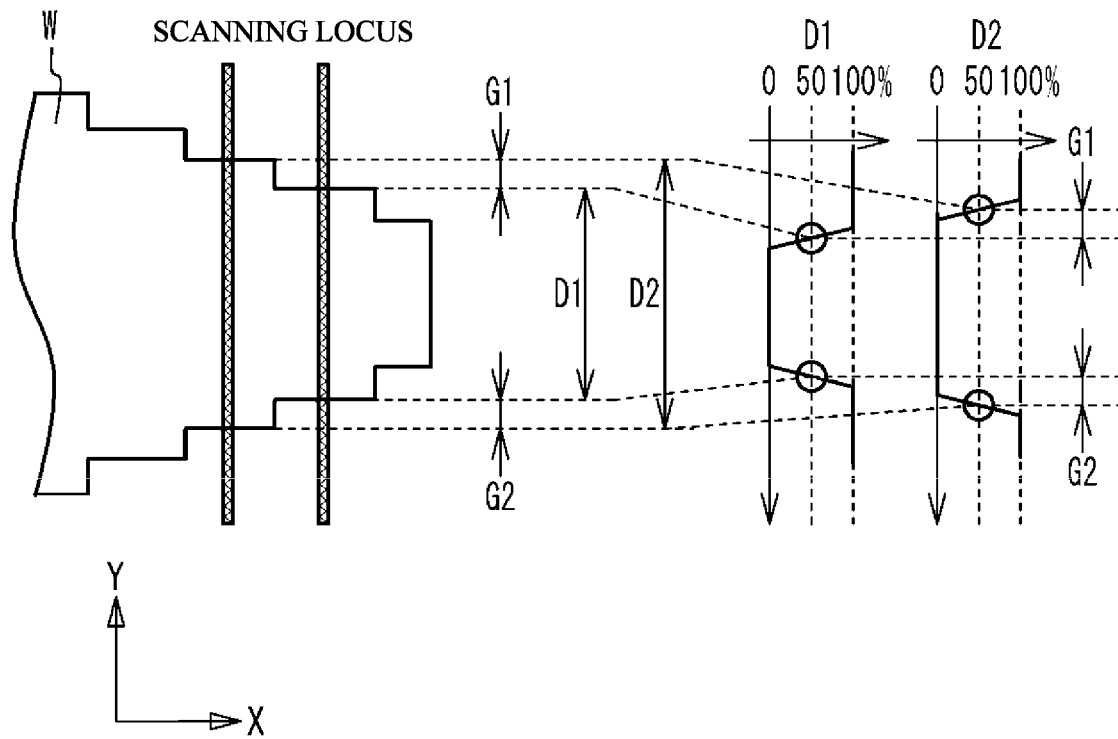
FIG. 3B illustrates a case where a level difference size is measured by two cycles of scanning.

When a level difference size G of the level difference LD is measured with use of the optical measuring device 100, a first outer diameter D1 and a second outer diameter D2 are measured as illustrated in FIG. 3B. It is possible to measure the outer diameter D1 and the outer diameter D2 by detecting a rising edge and a falling edge in a voltage wave detected by the voltage detection circuit 51. It is possible to measure a first level difference size G1 and a second level difference size G2 by calculating a half of a difference between the outer diameter D1 and the outer diameter D2. However, in this case, two cycles of scanning is performed with respect to the crank shaft. The scanning includes a scanning for measuring the outer diameter D1 and a scanning for measuring the outer diameter D2.

Figure 4:
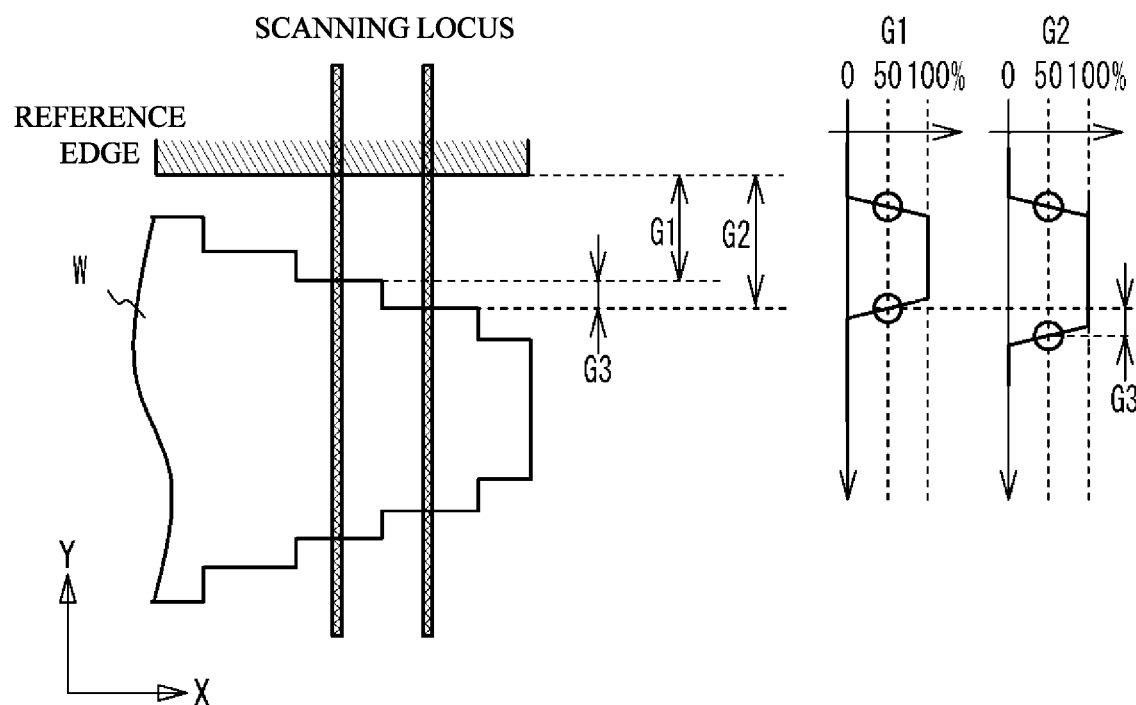
FIG. 4 illustrates a case where a level difference size is measured by two cycles of scanning.

Alternatively, as illustrated in FIG. 4, a gap G1 between the second outer circumference and the reference edge and a gap G2 between the first outer circumference and the reference edge are measured. It is possible to measure the gap G1 and the gap G2 by detecting the rising edge and the falling edge in the voltage wave detected by the voltage detection circuit 51. It is possible to measure a level difference size G3 between the first outer diameter and the second outer diameter by calculating a difference between the gap G1 and the gap G2. However, in this case, the scanning for measuring the gap G1 and the scanning for measuring the gap G2 are performed. Therefore, scanning is performed twice.

In the level difference measurement, it is effective to use a shaft measuring device or a projector. However, these devices are larger and more expensive than optical measuring devices. It is therefore difficult to use the shaft measuring device or the projector.

And so, in the embodiment, the scanning position (scanning locus) of the laser light in the XY plane is overlapped with the level difference LD, and the level difference size G is measured from the voltage wave obtained from the level difference LD.

Figure 5:
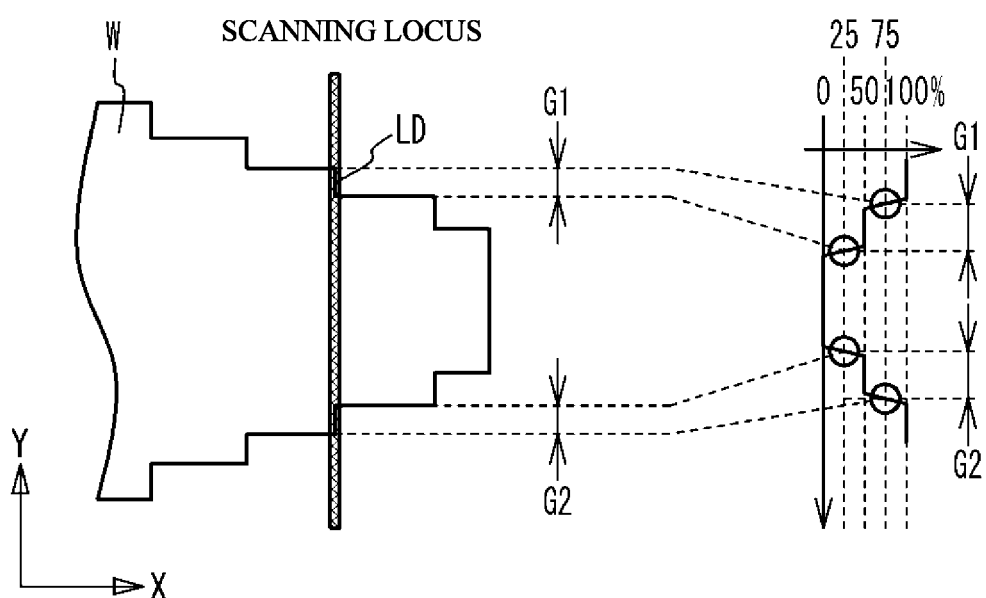
FIG. 5 illustrates a case where a level difference size is measured by a single scanning.

As illustrated in FIG. 5, the scanning locus of the laser light in the XY plane is overlapped with the level difference LD. In concrete, the center of the laser light is overlapped with the edge face of the level difference LD. The edge face of the level difference LD is a face extending in the scanning direction in the level difference LD and is in parallel with the YZ plane. In this case, the laser light is not interrupted in a range outside of the level difference LD in the Y-axis direction. Therefore, the voltage value detected by the voltage detection circuit 51 is 100%. When the laser light is emitted to the level difference LD, a part of the laser light is interrupted. Therefore, the voltage value detected by the voltage detection circuit 51 is a value between 0% and 100% (for example, 50%). The laser light is interrupted in a range inside of the level difference LD in the Y-axis direction. Therefore, the voltage value detected by the voltage detection circuit 51 is 0%. In this manner, when the scanning locus of the laser light is overlapped with the level difference LD, a part of the laser light is interrupted by the object W in a given time range. Therefore, the voltage wave detected by the voltage detection circuit 51 has three steps (for example, 100%, 50% and 0%). Therefore, the voltage wave has a first edge with respect to the voltage (100%) in the case where the laser light is not interrupted by the object W and a second edge with respect to the voltage (0%) in the case where the laser light is interrupted by the object W.

In this case, a middle position of the voltage (for example, near 75%) between 100% and 50% indicates a position where emission of the beam to the level difference starts. A middle position of the voltage (for example, near 25%) between 50% and 0% indicates a position where leaving of the beam from the level difference starts. It is therefore possible to measure the level difference size G by calculating a distance corresponding to the given time range where a part of the laser light is interrupted by the object W, from the first edge and the second edge.

In the embodiment, it is possible to detect the first edge and the second edge by a single scanning. It is therefore possible to measure the level difference size G by a single scanning.

Next, a description will be given of a structure for measuring the level difference size G with higher accuracy. FIG. 6A to FIG. 6C illustrate a voltage wave in which the voltage wave varies in three steps. As illustrated in FIG. 6B, ideally, the center of the laser light coincides with the edge face of the level difference LD. In this case, when the laser light is emitted to the level difference LD, a half of the laser light is interrupted. Therefore, the voltage value detected by the voltage detection circuit 51 in the level difference LD is 50%. In this case, the position where the voltage value detected by the voltage detection circuit 51 is 75% indicates the position where the overlapping of the center of the laser light with the level difference LD starts. The position where the voltage value detected by the voltage detection circuit 51 is 25% indicates the position where the leaving of the center of the laser light from the level difference LD starts.

However, there is a case where the center of the laser light is off the edge face of the level difference LD, because of error. For example, as illustrated in FIG. 6A, there is a case where the center of the laser light is off the edge face of the level difference LD outward in the X-axis direction. In this case, in the level difference LD, a range smaller than half of the laser light is interrupted. Therefore, the voltage value detected by the voltage detection circuit 51 in the level difference LD is larger than 50%. Next, as illustrated in FIG. 6B, there is a case where the center of the laser light is off the edge face of the level difference LD inward in the X-axis direction. In this case, in the level difference, a range larger than the half of the laser light is interrupted. Therefore, the voltage detected by the voltage detection circuit 51 in the level difference LD is smaller than 50%. In these cases, error may occur in the measuring of the level difference size G, when the voltage=75% is a starting position of the overlapping and the voltage=75% is a starting position of the leaving.

And so, as illustrated in FIG. 6A to FIG. 6C, in the first edge, the starting position of the overlapping is a center between the changing point of the voltage value changing from 100% and the changing point of the voltage value changing to the voltage in the level difference LD. In the second edge, it is preferable that the starting position of the leaving is a center between the changing point of the voltage value changing from the voltage value in the level difference LD and the changing point of the voltage value changing to 0%. When the center between the first edge and the second edge is defined in this manner, it is possible to suppress the measurement error of the level difference size G even if the center of the laser light is off the edge face of the level difference.

Alternatively, the voltage position which is just a center between the voltage (%) detected by the voltage detection circuit 51 in the level difference LD and 100% may be the position where the overlapping starts. And, the voltage position which is just a center between the detected voltage value (%) detected by the voltage detection circuit 51 in the level difference LD and 0% may be the position where the leaving starts. When the center of the first edge and the center of the second edge are defined in this manner, it is possible to suppress the measurement error of the level difference size G even if the center of the laser light is off the edge face of the level difference LD.

First Modified Embodiment

When the scanning direction of the laser light is inclined with respect to the direction in which the plurality of level differences are arrayed, the scanning locus of the laser light does not coincide with the level difference, and the edges may be lost.

Figure 7:
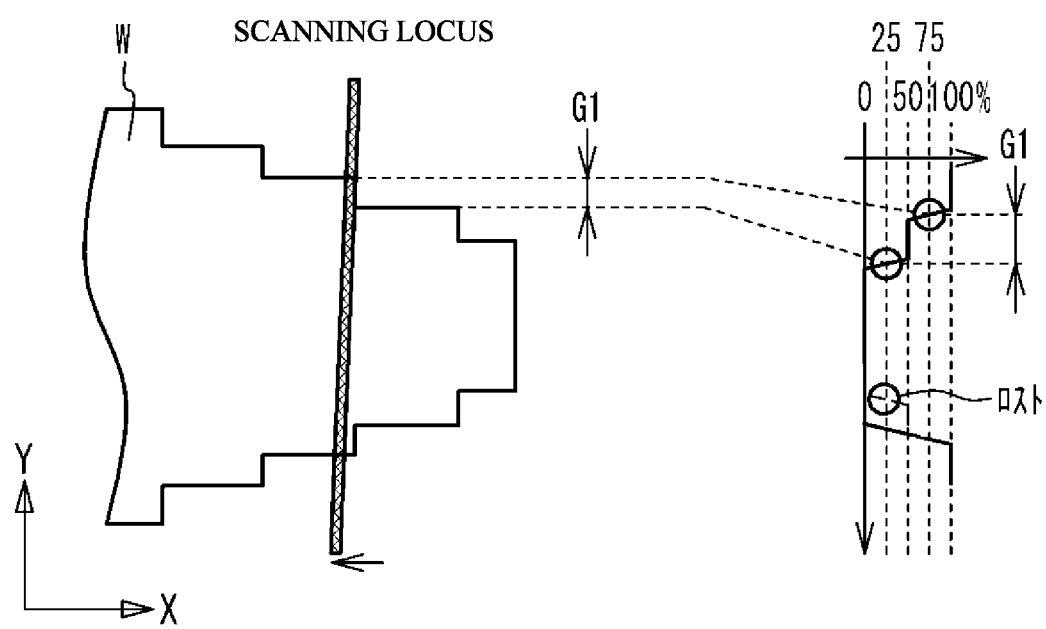
FIG. 7 illustrates a case where a scanning direction of a laser light is inclined with respect to a level difference LD.

For example, as illustrated in FIG. 7, even if the scanning locus of the laser light is overlapped with the level difference LD, the scanning locus of the laser light may be off another level difference, when the scanning direction of the laser light is inclined with respect to the direction in which the plurality of level differences are arrayed. In this case, the rising edge may be lost. And it may not be necessarily possible to measure the size of the level difference which is off the scanning locus of the laser light.

Figure 8:
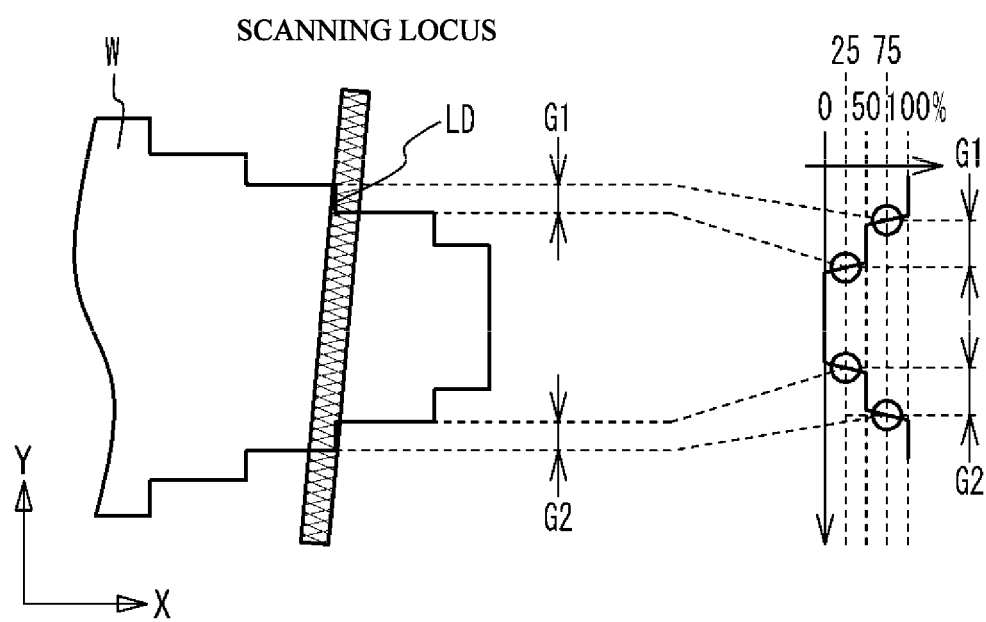
FIG. 8 illustrates a case where a beam diameter of a laser light is enlarged.

And so, as illustrated in FIG. 8, it is preferable that a beam diameter of the laser light is enlarged. In this case, even if the scanning direction of the laser light is inclined with respect to the array direction of the plurality of level differences, it is possible to emit the laser light to both of the level differences. For example, it is possible to sufficiently enlarge the beam diameter, by enlarging the beam diameter to 30 μm or more and 2 mm or less.

Second Modified Embodiment

Figure 9A:
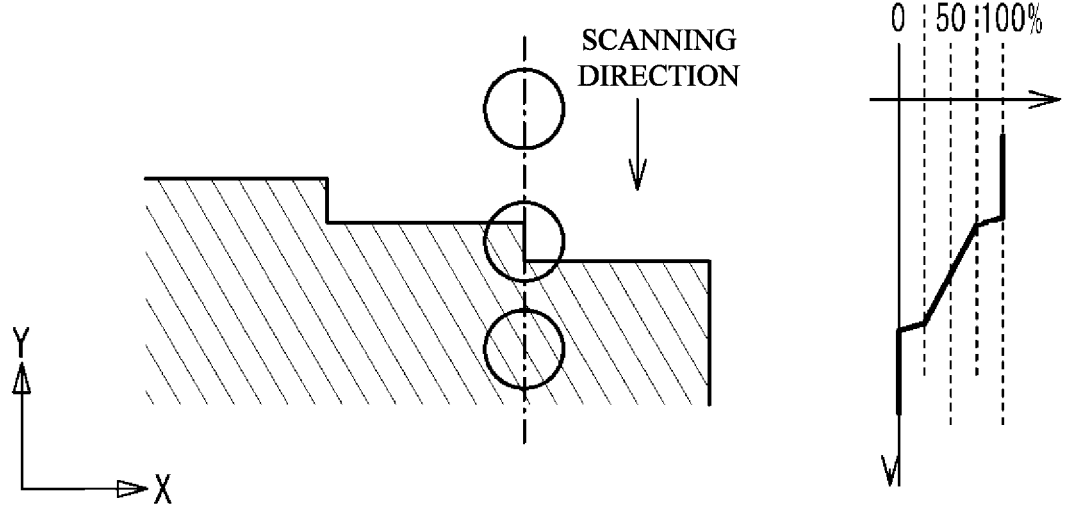
FIG. 9A and FIG. 9B illustrate a case where a cross section of a laser light is changed.

In a case where the level difference size G is small, it may be difficult to detect the edge when the beam diameter of the laser beam is excessively enlarged. For example, as illustrated in FIG. 9A, when the beam diameter is larger than the level difference size G; a period in which the voltage value detected by the voltage detection circuit 51 is 50% is small even if the center of the laser light coincides with the edge face of the level difference LD. Therefore, it may be difficult to detect the edge from the voltage wave.

Figure 9B:
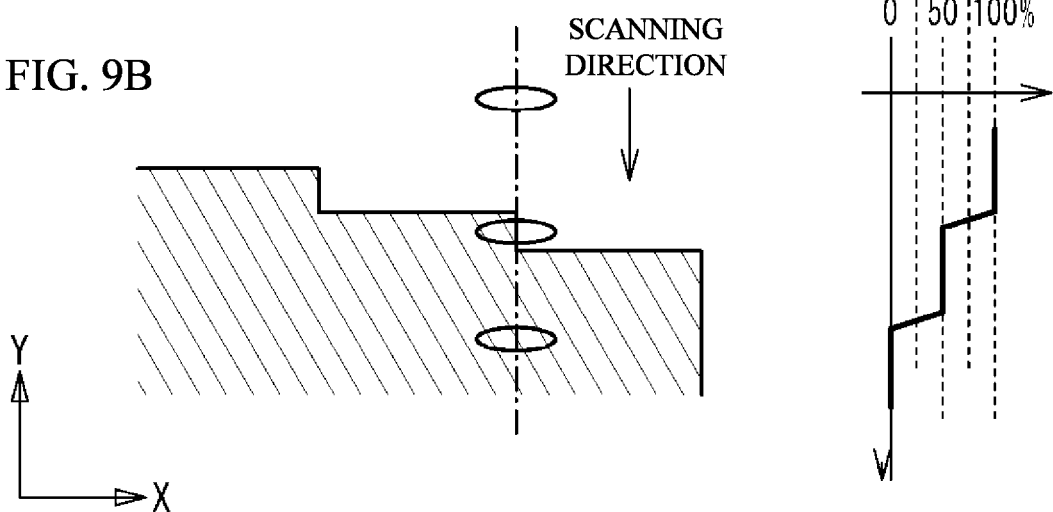
Figure 10A:
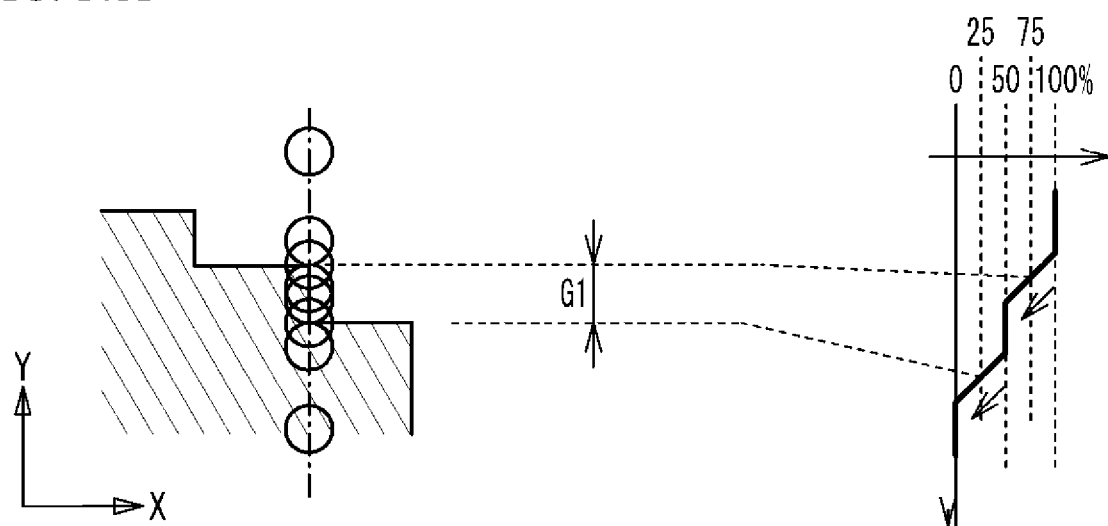
FIG. 10A and FIG. 10B illustrate a case where a cross section of a laser light is changed.
Figure 10B:
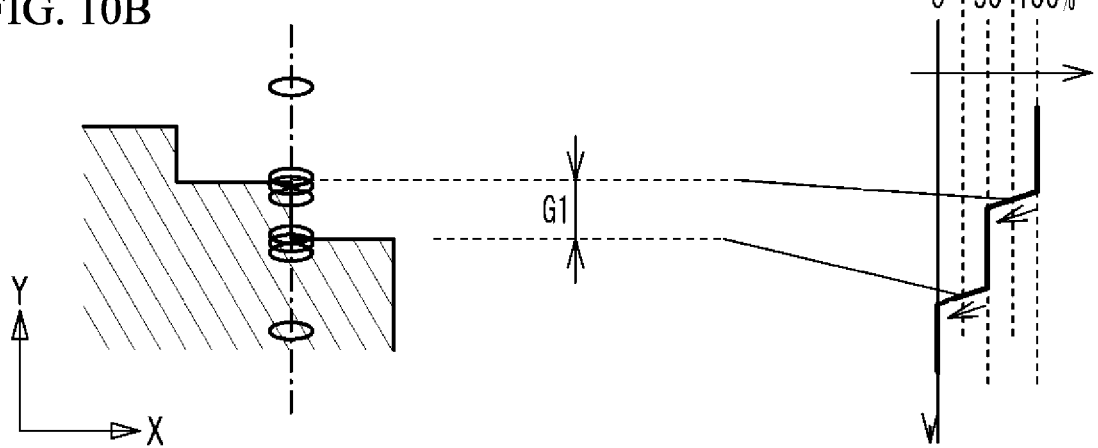

And so, as illustrated in FIG. 9B, it is preferable that a beam shape of the laser light (cross section shape) has a longer diameter in a direction intersecting with the scanning direction. For example, it is preferable that the cross section shape of the laser light has a longer diameter in the X-axis direction. For example it is preferable that the cross section shape of the laser light has an ellipse shape of which a longitudinal direction is the X-axis direction. In this case, it is easy to detect the edge. In particular, when the cross section shape of the laser light has a diameter smaller than the level difference size G in the Y-axis direction, a period in which the voltage value is constant in the level difference LD is long. It is therefore easy to detect the edge from the voltage wave.

For example, the beam diameter is sufficiently large and the detection of the edge from the voltage wave is easy, when the diameter of the laser light in the X-axis direction is 30 μm or more and 2 mm or less and the diameter in the Y-axis direction is smaller than the level difference size G.

When the cross section shape of the laser light is circle, time from a timing when the laser light is overlapped with the level difference LD to a timing when a center of the laser light reaches the edge face of the level difference LD is large. Therefore, the time range of the edge in the voltage wave is large. In this case, a slope of the voltage wave is gentle and the influence of a noise component may be large.

On the other hand, when the cross section shape of the laser light has a smaller diameter in the Y-axis direction, time from a timing when the laser light is overlapped with the level difference LD to a timing when a center of the laser light reaches the edge face of the level difference LD is small. Therefore, the time range of the edge in the voltage wave is small. In this case, a slope of the voltage wave is steep and the influence of a noise component may be small.

Figure 11B:
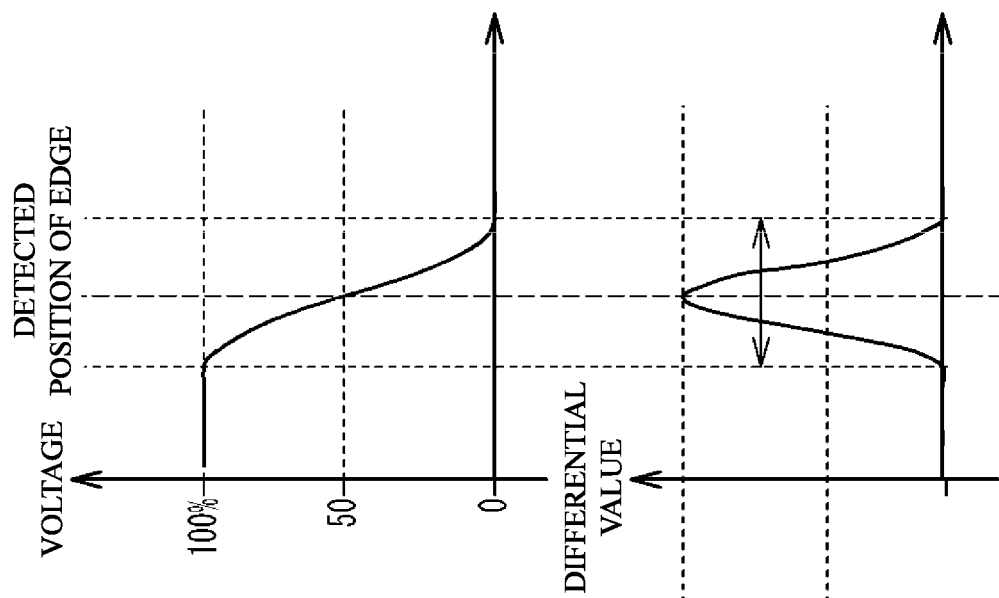
FIG. 11A and FIG. 11B illustrate a case where a cross section of a laser light is changed.
Figure 11A:
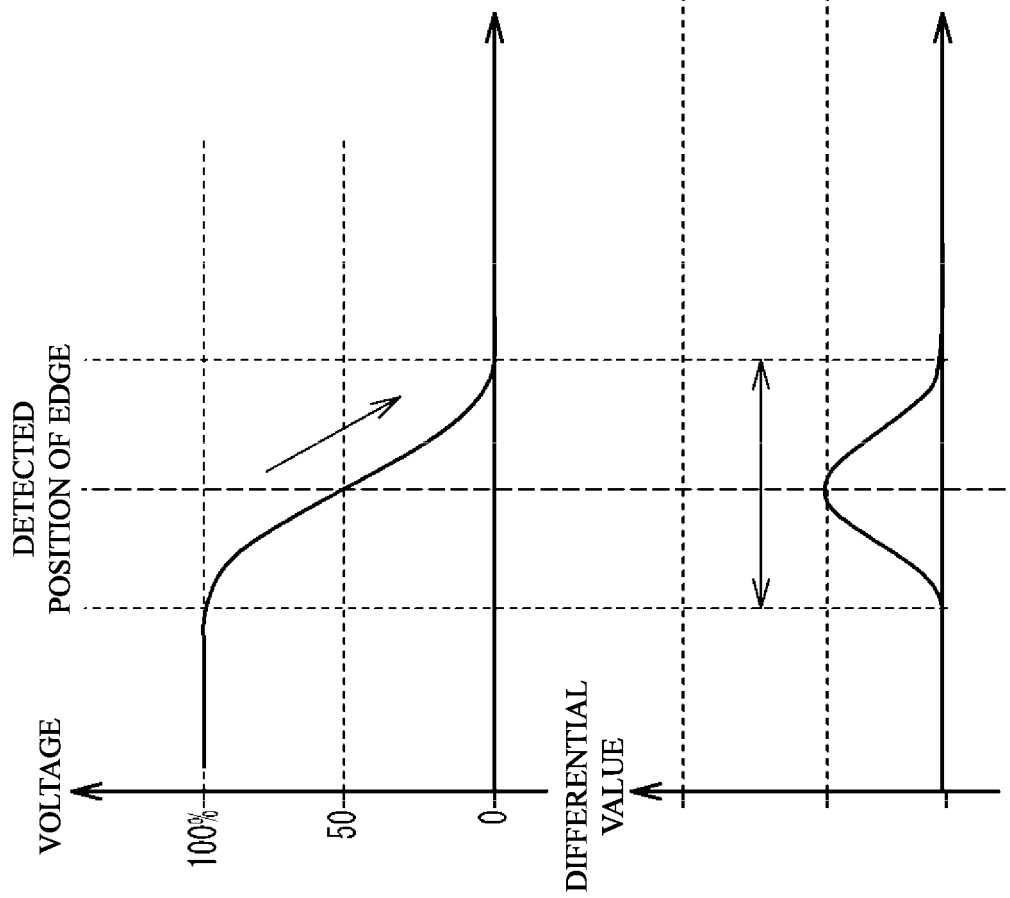

For example, as illustrated in FIG. 11A, when the slope of the voltage wave is gentle, the peak of the differential wave is gentle. Therefore, a local maximum value is small. Therefore, variation easily occurs in the determination of the edge position. On the other hand, as illustrated in FIG. 11B, when the slope of the voltage wave is steep, the peak of the differential wave is steep. And a local maximum value is large. Therefore, variation hardly occurs in the determination of the edge position.

Figure 12A:
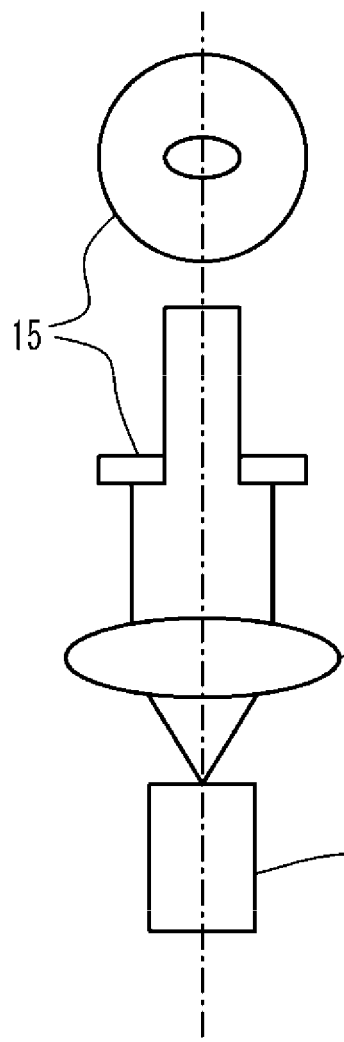
FIG. 12A and FIG. 12B illustrate a structure for changing a cross section of a laser light.
Figure 12B:
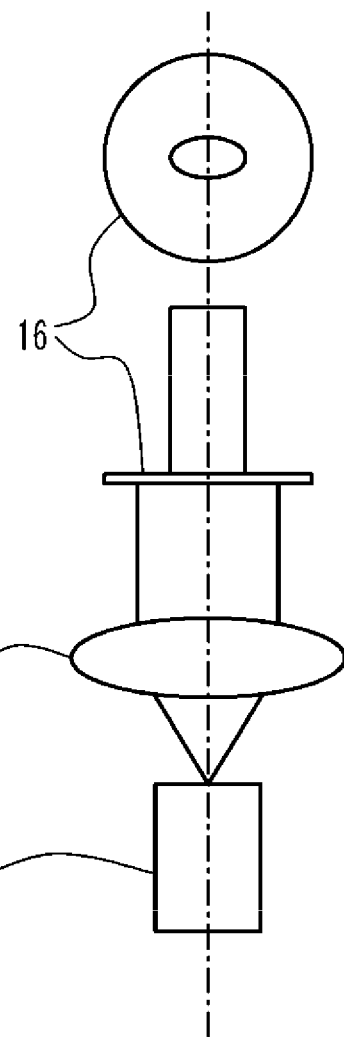

As illustrated in FIG. 12A, a throttle 15 having an ellipse shape condenses the collimated light after a collimate lens 14 collimates the light emitted by the laser light source 11, the cross section shape of the laser light is converted into an ellipse shape. Alternatively, as illustrated in FIG. 12B, the cross section shape of the laser light is converted into an ellipse shape, by using a film 16 for changing permeation intensity of light varies according to a position.

In the above-mentioned embodiments, the light emission device 10 and the scanning device 20 act as an emission device configured to emit a scanning light, of which an optical axis parallelly moves, to an object. The light receiving element 42 acts as a light receiving element configured to perform photoelectric conversion with respect to the scanning light after passing over the object. The calculation device 50 acts as a calculation device configured to calculate, from a voltage wave obtained from time change of an electrical signal that is output by the light receiving element, a distance corresponding to a time range from a first edge with respect to a voltage value where the scanning light is not interrupted by the object and a second edge with respect to a voltage value where the scanning light is interrupted by the object, when a part of the scanning light is interrupted by the object for the time range.

The present invention is not limited to the specifically disclosed embodiments and variations but may include other embodiments and variations without departing from the scope of the present invention.

What is claimed is:

1. An optical measuring device comprising:
    an emission device configured to emit a scanning light, of which an optical axis parallelly moves in a direction vertical to the optical axis, to an object having a level difference in a direction vertical to the optical axis of the scanning light and vertical to a scanning direction of the scanning light;
    a light receiving element configured to perform photoelectric conversion with respect to the scanning light after passing over the object; and
    a calculation device configured to calculate, when scanning of the scanning light includes a first time period where the scanning light is not interrupted by the object, a second time period where a part of the scanning light is interrupted by the level difference, and a third time period where the scanning light is interrupted by the object, from a voltage wave obtained from time change of an electrical signal that is output by the light receiving element in the second time period, a distance corresponding to a time range from a first edge with respect to a voltage value where the scanning light is not interrupted by the object and a second edge with respect to a voltage value where the scanning light is interrupted by the object, wherein the calculation device is configured to detect the level difference in the direction vertical to the optical axis of the scanning light, based on the distance calculated by the calculation device.

2. The optical measuring device as claimed in claim 1, wherein the calculation device is configured to calculate the distance, from a middle point of the first edge and a middle point of the second edge.

3. The optical measuring device as claimed in claim 1, wherein a maximum diameter of a cross section of the scanning light is 30 μm or more and 2 mm or less.

4. The optical measuring device as claimed in claim 1, wherein a cross section shape of the scanning light has a diameter smaller than the distance in a scanning direction of the scanning light.

5. The optical measuring device as claimed in claim 1, wherein a cross section shape of the scanning light has a longer diameter and a shorter diameter, the longer diameter intersecting with a scanning direction of the scanning light.

6. The optical measuring device as claimed in claim 1, wherein voltage wave changes in the first edge from a first voltage to a second voltage larger than the first voltage and changes in the second edge from the second voltage to a third voltage larger than the second voltage, or the voltage wave changes in the first edge from a fourth voltage to a fifth voltage smaller than the fourth voltage and changes in the second edge from the fifth voltage to a sixth voltage smaller than the fifth voltage.

7. The optical measuring device as claimed in claim 1, wherein the optical axis of the scanning light parallels moves in the direction vertical to the optical axis when the optical axis is at an initial point.

8. An optical measuring method comprising:
emitting a scanning light, of which an optical axis parallelly moves in a direction vertical to the optical axis, to an object from an emission device, the object having a level difference in a direction vertical to the optical axis of the scanning light and vertical to a scanning direction of the scanning light;

performing photoelectric conversion with respect to the scanning light after passing over the object, by using a light receiving element;

calculating, when scanning of the scanning light includes a first time period where the scanning light is not interrupted by the object, a second time period where a part of the scanning light is interrupted by the level difference, and a third time period where the scanning light is interrupted by the object, from a voltage wave obtained from time change of an electrical signal that is output by the light receiving element in the second time period, a distance corresponding to a time range from a first edge with respect to a voltage value where the scanning light is not interrupted by the object and a second edge with respect to a voltage value where the scanning light is interrupted by the object, when a part of the scanning light is interrupted by the object for the time range, wherein, in the calculating, the level difference in the direction vertical to the optical axis of the scanning light is detected, based on the distance calculated in the calculating.

* * * * *